United States Patent [19]
Jones et al.

[11] 3,907,842
[45] Sept. 23, 1975

[54] PREPARATION OF 6α AND 6β CARBOXYMETHYLSTEROID CONJUGATES

[75] Inventors: Charles D. Jones; Norman R. Mason, both of Indianapolis, Ind.

[73] Assignee: Eli Lilly and Company, Indianapolis, Ind.

[22] Filed: Apr. 1, 1974

[21] Appl. No.: 456,568

[52] U.S. Cl. ............... 260/397.1; 260/121
[51] Int. Cl.$^2$ ............................ C07J 11/00
[58] Field of Search ................... 260/397.1

Primary Examiner—Elbert L. Roberts
Attorney, Agent, or Firm—James L. Rowe; Everet F. Smith

[57] ABSTRACT

6α and 6β-Carboxymethylsteroid conjugates, useful in radioimmunoassay procedures.

5 Claims, No Drawings

PREPARATION OF 6α AND 6β CARBOXYMETHYLSTEROID CONJUGATES

BACKGROUND OF THE INVENTION

Steroid-protein conjugates, capable of stimulating antibody production upon injection into mammals, were first prepared by Erlanger et al., *J. Biol. Chem.*, 228, 713 (1957); 234, 1090 (1959). In the ensuing years, many antibodies were prepared, in which a steroid was the hapten, by coupling a steroid to a protein. In preparing such antibodies, the prevailing technique involved converting a steroid derivative containing a free carboxyl group to a mixed anhydride and then causing the mixed anhydride to react with a free amino group (e. g. lysine) of the protein. Among the carboxyl-group containing steriod derivatives that have been used are testosterone 17-chlorocarbonate, testosterone 3-(0-carboxymethyl) oxime, cortisone 21-hemisuccinate, progesterone 20-(0-carboxymethyl) oxime, deoxycorticosterone 21-hemisuccinate, estrone 17-(0-carboxymethyl) oxime, and pregnenolone 20-(0-carboxymethyl) oxime. A review of the early literature relating to such preparations can be found in *Methods of Immunology and Immunochemistry*, Vol. 1 page 144, (1967). More recently, Gross et al. *Steroids*, 18, 555 (1971) have coupled diazobenzoic acid with estriol through the phenolic ring of estriol. A mixed anhydride with cyclohexyl carbodiimide was empolyed in coupling the carboxysteroid to the protein. Exley, *Steroids*, 18, 605 (1971) prepared a highly specific antiserum for 17β-estradiol by coupling 17β-estradiol-6-(0-carboxymethyl) oxime to bovine serum albumin (BSA). Progesterone also has been made a hapten by coupling 11α-hydroxyprogesterone hemisuccinate to bovine serum albumin—see DeVilla, *J. Clin. Endrocinol. Metab.*, 35, 458 (1972) and Spieler et al, *Steroids*, 19, 751 (1972). This later publication also lists the cross-reactivity of various steroids in a progesterone assay using antisera prepared from the previously synthesized progesterone-BSA conjugate. Lindner et al., *Steroids*, 19, 357 (1972) determined that 17β-estradiol and estriol in the form of their 6-(0-carboxymethyl) oximes as well as progesterone in the form of its 11α-hemisuccinate were found to couple to lysine residues in the protein polypeptide chain and that the antisera derived therefrom were more specific than those prepared from an estradiol-17β-hemisuccinate conjugate with bovine serum albumin. Finally, Weinstein et al, *Steroids*, 20, 789 (1973) prepared the 7α-carboxymethylthioether of both testosterone and progesterone and coupled these derivatives to BSA by use of the carbodiimide reagent to produce an antibody capable of eliciting antisera when injected into suitable mammalian species. In addition, the authors stated that the 6-carboxymethylmercapto derivative of progesterone had been used to prepare antisera to progesterone for use in an immuno-assay.

Antisera derived by injection of steroid-protein conjugates prepared according to the above procedures frequently show cross-reaction with unrelated steroids and thus are not ideally suited for use in any assay procedure for a specific steroid. For example, the conjugates prepared from 11-hydroxyprogesterone hemisuccinate show cross-reaction with several unrelated 11-hydroxy steroids.

It is an object of this invention to prepare steroid-protein conjugates by utilizing intermediate steroid compounds which are easier to prepare and more stable than those hitherto available. It is also an object of this invention to prepare steroid conjugates with proteins which are capable of producing antisera of extremely high specificity. Other objects of this invention will become more apparent from the description which follows.

SUMMARY OF THE INVENTION

In fulfillment of the above and other objects, this invention provides 6-carboxymethylsteroids of the structure:

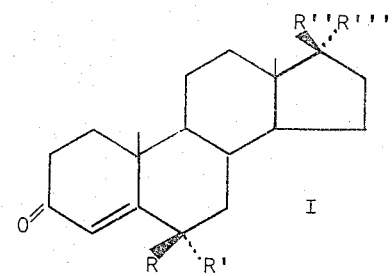

wherein one of R and R' is carboxymethyl ($CH_2$—COOH) and the other is hydrogen, and wherein R'', taken singly, is hydroxy or acetyl ($CH_3$—CO), R''', taken singly, is hydrogen, and R'' and R''', taken together with the carbon to which they are attached, form a carbonyl (C=O) group. Also included within the scope of this invention are reaction products of the above steroids with proteins in which the 6-carboxymethyl group has reacted with a free amine group within a polypeptide chain in the protein to form a 6-carboxamidomethyl linkage.

Compounds according to structure I above are white crystalline solids or high boiling oils. The compounds can be prepared as follows from a steroid starting material in which R and R' are both H: the ketone groups present at C-3 and C-21 when R'' is acetyl and both R and R' are hydrogen (progesterone) or at C-3 and C-17 when R' and R''' form a carbonyl (androst-4-ene-3,17-dione) are protected by ketal formation, preferably by reaction with ethylene glycol in the presence of an acid catalyst. Ketal formation at C-3 is accompanied by rearrangement of the 4,5-double bond to the 5,6 position (out of conjugation). Epoxidation of the 5,6-double bond yields a 5α, 6α-epoxide. Opening of the epoxide ring with an allyl Grignard reagent provides a 5α-hydroxy-6β-allyl derivative. Oxidation of the allyl group, preferably with a ruthenium dioxide-sodium periodate reagent, serves to produce a 6β-carboxymethyl compound. The reaction conditions also serve to partially hydrolyze the ketal group to yield in particular, a ketone group at C-3. Further deketalization is accomplished by treatment with a strong acid, preferably perchloric acid. Dehydration of the resulting molecule to provide a conjugated 3-keto$\Delta^4$ derivative is now readily accomplished by basic treatment, thus forming 6β-carboxymethylprogesterone (I above when R is carboxymethyl, R' and R''' are H, and R'' is acetyl) or 6β-carboxymethylandrost-4-ene-3,17-dione (I above when R is carboxymethyl, R' is H, and R'' and R''' together form the oxygen of a carbonyl.)

6β-Carboxymethyltestosterone is prepared from the latter compound by reducing both the C-3 and C-17 ketones with, for example, sodium borohydride, to produce a C-3β, C-17β diol. Other hydride reducing agents such as $KBH_4$, $LiAlH_4$ and the like can also be used. Selective oxidation of the diol with manganese dioxide or other suitable oxidizing agent, produces a ketone only at C-3 to yield the 6β-carboxymethyltestosterone (I when R is carboxymethyl, R' and R''' are H and R'' is OH). The 6α-carboxymethyl derivatives (I when R is carboxymethyl and R is H) of the above 6β compounds are prepared by epimerization accomplished by treatment of the 6β compound under acidic conditions, usually with a catalytic quantity of an acid such as p-toluene sulfonic acid in a non-polar solvent, preferably benzene.

The compounds of this invention are useful for coupling by covalent bonding to proteins, thus producing an antigen capable of eliciting antibodies to testosterone or progesterone useful in immune assays. The compounds of this invention, being carboxylic acids, are coupled to the protein by means of a mixed anhydride with, for example, i-butylchlorocarbonate. Other mixed anhydrides, such as those formed with $SO_3$, can also be used.

The steroid conjugates thus formed can be described by formula I above wherein one of R and R' is carboxamidomethyl ($-NH-CO-CH_2$) in which the methylene group is attached to the 6-position of the steriod and the amide moiety ($-NH-$) is attached to a protein and is derived from a free amino group of the protein, probably from a lysine residue in an amino acid chain of the protein.

By our invention, the steriods are coupled to the protein through C-6 of the steroid molecule, an area of the molecule remote from both the conjugated ketone at C-3 and from the side chain at C-17. The antibodies formed from these antigens are thus more specific and have fewer cross-reactions to other related steroids than antibodies to coupled antigens made through other carbons of the progesterone or testosterone molecules. Antisera to the steroid conjugates of this invention can be obtained from rabbits or other mammals by the procedure of Vaitukaitis et al, *J., Clin. Endocrinol. Metab.*, 33, 988 (1971). In this procedure, equal volumes of the conjugate in saline and complete Freund's adjuvant are homogenized to give a final concentration of antigen of 1 mg/ml. The emulsion is injected intradermally at 20–30 sites on the backs of New Zealand white rabbits so that each animal received 2–3 ml of material. At the same time, 0.5 ml of *Bordetella pertussis* vaccine are injected at a separate site. The animals are given additional doses of 1–2 mg of anitgen in a similar manner at 4–6 week intervals. Starting the fifth week after the initial dose, the rabbits are bled weekly and the titer determined on each antiserum as the dilution which would bind approximately 50 percent of 10–15,000 cpm of added $^3$H-progesterone (sp. act. 33.5 C/mmole). The antiserum titer is sufficiently high (1:10,000) by the seventh week to be useful for radioimmunoassay procedures.

A typical immunoassay procedure employing antisera produced from the steroid conjugate antigens of this invention is carried out as follows:

The standard assay consists of the addition of 0.5 ml of phosphate buffer, 0.2 ml of antiserum diluted with the buffer, and 50 microliters of $^3$H-progesterone (0.02 microcuries) in buffer. The samples are incubated for at least 2 hours at 4°C. and then 0.2 ml of dextran-coated charcoal is added and mixed. The samples are centrifuged, the supernatant is decanted into counting vials and 10 ml of counting solution are added for scintillation counting. When standard progesterone or other test steroids are incorporated in the assay, they are added to the assay tubes in methanol which is evaporated and the initial 0.5 of buffer is added to dissolve them.

The specificity or percent cross-reactions of the antisera produced from the progesterone-coupled antigens of this invention to other steroids was determined by the amount of test compund, compared to the amount of standard progesterone, needed to displace 50 percent of the bound $^3$H-progesterone. The data presented below were all obtained using the antiserum from a single bleeding of one rabbit for each antigen. The initial dilution of each antiserum was 1:20,000. The standard curve for progesterone was run between 50 and 1000 pg.

The results of these competition experiments are presented in Table 1 as the percent cross-reaction of each steroid specified compared to progesterone.

Table 1

| Steroid | Percent Cross Reaction | |
| --- | --- | --- |
| | P-6α | P-6β |
| Progesterone | 100 | 100 |
| 5α-Pregnane-3,20-dione | 100 | 67 |
| 5β-Pregnane-3,20-dione | 19 | 8.4 |
| 6β-Hydroxyprogesterone | 59 | 58 |
| 11α-Hydroxyprogesterone | 7.3 | 4.1 |
| 3β-Hydroxypregn-5-ene-20-one | 11.4 | 13.6 |
| 20α-Hydroxypregn-4-ene-3-one | 0.13 | 0.11 |
| 17α-Hydroxyprogesterone | 1.0 | 0.16 |
| 11-Desoxycorticosterone | 0.79 | 0.62 |
| Corticosterone | <0.03 | <0.03 |
| Pregnane-3α,20α-diol | <0.03 | <0.03 |
| Testosterone | <0.03 | <0.03 |
| Androstenedione | <0.03 | <0.03 |
| 17β-Hydroxy-5α-androstane-3-one | <0.03 | <0.03 |
| Estrone | <0.03 | <0.03 |
| Estradiol-17β | <0.03 | <0.03 |

The results of similar competition experiments with testosterone antisera prepared by the process of this invention are given in Table 2 below and were determined in the same manner as with the progesterone antisera except that $^3$H-test-osterone was used as the tracer chemical and each antiserum was used at a dilution of 1:25,000. The standard curve for test-osterone was run between 20 and 1000 pg.

Table 2

| Steroid | Percent Cross Reaction | |
| --- | --- | --- |
| | T-6α | T-6β |
| Testosterone | 100 | 100 |
| 17β-Hydroxy-5α-androstan-3-one | 95 | 75 |
| 19-Nortestosterone | 1.3 | 6.6 |
| Androst-4-ene-3,17-dione | 0.19 | 0.51 |
| 3β-Hydroxy-5α-androstan-17-one | 0.06 | 0.18 |
| 3β-Hydroxyandrost-5-en-17-one | 0.02 | 0.09 |
| 3α-Hydroxy-5α-androstan-17-one | 0.02 | 0.08 |
| 3α-Hydroxy-5β-androstan-17-one | 0.02 | <0.02 |
| 17α-Methyltestosterone | — | 0.04 |
| Estradiol-17β | 0.02 | 0.10 |
| 11-Desoxycorticosterone | <0.02 | <0.02 |
| Corticosterone | <0.02 | <0.02 |
| 3β-Hydroxypregn-5-en-20-one | <0.02 | <0.02 |
| 17α-Hydroxyprogesterone | <0.02 | <0.02 |

This invention is further illustrated by the following specific examples.

EXAMPLE 1

Preparation of Pregn-5-ene-3,20-dione bis-ethylene ketal

A reaction mixture prepared from 45 g of progesterone, 900 ml of ethylene glycol and a catalytic quantity of p-toluene-sulfonic acid monohydrate was heated slowly over a period of 3 hours under reduced pressure (2 mm/Hg). Solvent and water began to distill at a temperature in the range of 75°–78°C. Distillation was continued until 300 ml of distillate had been collected. Upon cooling, crystals of pregn-5-ene-3,20-dione bis-ethylene ketal appeared. The resulting suspension was poured into 3 l. of 10 percent aqueous sodium carbonate at 0°C. Recrystallization from 200 ml of acetone yielded 50 g of pregn-5-ene-3,20-dione bis-ethylene ketal, m.p. 179°–80°C.

EXAMPLE 2

Preparation of 5α,6α-Epoxypregnane-3,20-dione bis-ethylene ketal

A solution of 17.2 g of m-chloroperbenzoic acid in 400 ml of methylene chloride was added to a solution of 30 g of pregn-5-ene-3,20-dione bis-ethylene ketal in 750 ml of methylene chloride at about 0°C. After the addition of the perbenzoic acid had been completed, the reaction mixture was maintained at about 0°C overnight and was then warmed to 25°C and shaken with 2 l. of water. The methylene chloride layer was separated, washed with 2 100-ml portions of 10 percent aqueous sodium carbonate and then dried. Evaporation of the solvent in vacuo yielded a foamy residue. The residue was extracted with 2 30-ml portions of hot hexane, which extracts were discarded. The hexane-insoluble residue was recrystallized from an ethyl acetate-hexane solvent mixture to yield 5α,6α-epoxypregnane-3,20-dione bis-ethylene ketal melting at about 184°–5°C. The nmr spectrum of the product showed an absence of contaminating 5α,6α-epoxide.

EXAMPLE 3

5α-Hydroxy-6β-(2-propenyl)-pregnane-3,20-dione bis-ethylene ketal

A Grignard reagent was prepared from 0.15 mole of allyl bromide and 24 g of magnesium in 50 ml of ether. After filtration, the resulting reagent was added in drop-wise fashion to 10 g of 5α,6α-epoxypregnane-3,20-dione bis-ethylene ketal in 50 ml of anhydrous tetrahydrofuran (THF). After the allyl magnesium bromide had all been added, additional THF was added, and the resulting mixture refluxed for 3 hours. The reaction mixture was then cooled and poured over 500 ml of a mixture of saturated aqueous ammonium chloride and ice. 5α-Hydroxy-6β-(2-propenyl)pregnane-3,20-dione bis-ethylene ketal formed in the above reaction was extracted with 200 ml of ethyl acetate. The ethyl acetate extract was separated and was washed with two 100 ml portions of 10 percent aqueous sodium bicarbonate and then dried. Evaporation of the solvent in vacuo yielded a colorless oil. Recrystallization of the oil from methanol yielded white crystals of 5α-hydroxy-6β-(2-propenyl)pregnane-3,20-dione bis-ethylene ketal melting at about 105°–106° C. (94 percent yield); nmr δ0.77 (s, 3H,—CH$_3$) δ1.00 (s, 3H,—CH$_3$) δ1.28 (s, 3H,—CH$_3$) δ3.95 (2, 8H,—OC$_2$CH$_2$O) δ4.28 (s, 1H,—OH) δ4.90 (m, 2H,—CH—CH$_2$) δ5.58 (m, 1H,CH—CH$_2$).

Anal. Calcd for C$_{28}$H$_{44}$O$_5$: C, 73.01; H, 9.63; O, 17.37.

Found C, 73.25; H, 9.82; O, 17.28.

EXAMPLE 4

Preparation of 5α-Hydroxy-6β-carboxymethylpregnane-3,20-dione

A solution of 3 g of 5α-hydroxy-6β-(2-propenyl)-pregnane-3,20-dione bis-ethylene ketal in 60 ml of acetone was stirred vigorously while a yellow solution of RuO$_4$—NaIO$_4$ (prepared from 150 mg RuO$_2$, 6.0 g NaIO$_4$ and 30 ml of water stirred for 5 minutes at 25°C) was added to the acetone solution. Stirring was continued for 1 hour. A second equal catalyst portion was added, and the reaction mixture stirred for an additional hour. Next, 5 ml of 2-propanol were added, and stirring continued for 15 minutes. Black solids which precipitated at this point were separated by filtration, and the acetone was removed from the filtrate by evaporation in vacuo below 40°C. The aqueous medium contained in suspension 5α-hydroxy-6β-carboxymethylpregnane-3,20-dione formed in the above reaction. The suspended compound was dissolved in a minimum amount of 10 percent aqueous sodium bicarbonate. The resulting aqueous phase was washed several times with ether, and the ether washes discarded. The aqueous layer was then acidified at 0°C with 6N aqueous hydrochloric acid. 5α-Hydroxy-6β-carboxymethylpregane-3,20-dione being insoluble in the acidic medium, separated and was extracted with three 100 ml portions of ethyl acetate. The ethyl acetate extracts were combined and dried. Evaporation of the ethyl acetate yielded 2 g of an amorphous residue which was dissolved in a solvent mixture containing 20 ml of THF and 20 ml of 3N aqueous perchloric acid. The subsequent reaction mixture was stirred at 25°C for 30 minutes after which time the THF was removed by evaporation while maintaining the temperature below about 35°C. Crystals of 5α-Hydroxy-6β-carboxymethylpregnane-3,20-dione precipitated and were collected by filtration. The filter cake was washed with an ice-water mixture and then dried. Two-fold recrystallization of the solid thus obtained from a methanol-water solvent mixture yielded crystalline 5α-hydroxy-6β-carboxymethylpregnane-3,20-dione melting at about 218°–219°C; nmr 0.60 (s, 3H,CH$_3$) δ1.15 (s, 3H, CH$_3$) δ2.08 (s, 3H,—CO—CH$_3$) δ4.28 (broad 3,20 diketone and 6-carboxyl); infra red spectrum, absorption maxima, band at 5.85 μ (broad, 3,20-diketone and 6-carboxyl).

Anal. Calcd for C$_{23}$H$_{34}$O$_5$: C, 70.74; H, 8.78; O, 20.48.

Found: C, 70.46; H, 8.88; O, 20.18.

EXAMPLE 5

Preparation of 6β-Carboxymethylpregn-4-ene-3,20-dione

A reaction mixture containing 1.3 g of 5α-hydroxy-6β-carboxymethylpregnane 3,20-dione and 3.0 g of potassium hydroxide in 150 ml of methanol was stirred for about 1 hour at 25°C. The reaction mixture was evaporated to near dryness while maintaining the temperature below about 30°C. Twenty-five milliliters of an ice-water mixture were then added, and the resulting aqueous mixture acidified with 55 millimoles of 1N aqueous hydrochloric acid while maintaining the temperature in the range 0° to 5°C. An oily product appeared comprising 6β-carboxymethylpregn-4-ene-3,20-dione. The ethyl acetate layer was separated and was washed with 250 ml portions of a saturated aqueous sodium chloride solution and then dried. Evaporation of the solvent yielded crystalline 6β-carboxymethylpregn-4-ene-3,20-dione. Recrystallization of the crystals from methanol yielded purified 6β-carboxymethylpregn-4-ene-3,20-dione: m.p. 214°–215°C (69 percent yield). Ultraviolet spectrum $\lambda_{max}^{EtOH}$ (log $\epsilon$) 245 μ (4.25); infrared spectrum, absorption maxima at 5.85 μ (broad), 6.00 μ; nmr, δ0.59 (s, 3H, CH$_3$) δ1.23 (s, 3H, CH$_3$) δ2.10 (s, 3H, CO—CH$_3$) δ5.83 (s, 1H, C-4 vinylic H) δ10.56 (s, 1H, COOH); optical rotatory dispersion (dioxane, C 0.18):

[α] 362 + 2900, [α] 354 + 2350, [α] 346 + 3050, [α] 342 + 2920, [α] 308 + 9520, [α] 276 + 1420, [α] 248 + 5680, [α] 230 − 16800.

Anal. Calcd for C$_{23}$H$_{32}$O$_4$: C, 74.16; H, 8.66; O, 17.18.

Found: C, 73.96; H, 8.82; O, 16.89.

Mass spectrum, molecular ion, m/e 372.

EXAMPLE 6

Preparation of
6α-Carboxymethylpregn-4-ene-3,20-dione

A solution containing 80 mg of p-toluenesulfonic acid in 25 ml of benzene was added to a solution of 1.0 g of 6β-carboxymethylpregn-4-ene-3,20-dione in 50 ml of refluxing benzene. The reaction mixture was refluxed for 1.5 hours and was then cooled. Evaporation of the solvent yielded an oily residue comprising 6α-carboxymethylpregn-4-ene-3,20-dione formed in the above epimerization. The oily residue was dissolved in a solution of 1 g of sodium bicarbonate in 25 ml of water. The aqueous solution was extracted with two 25 ml portions of ether which were separated and discarded. The aqueous solution was then acidified with 12.5 ml of 1N aqueous hydrochloric acid. 6α-Carboxymethylpregn-4-ene-3,20-dione, being insoluble in the acidic layer, separated as an oil and was extracted with 50 ml of ethyl acetate. The ethyl acetate layer was separated and washed with two 50 ml portions of a saturated aqueous sodium chloride solution. Evaporation of the solvent therefrom yielded 650 mg (65 percent yield) of an amorphous white foam. 6α-Carboxymethylpregn-4-ene-3,20-dione thus prepared had the following physical characteristics: Ultraviolet spectrum: $\lambda_{max}^{EtOH}$ (log $\epsilon$) 241 μ (4.11); infrared spectrum, absorption peaks at 5.86 (broad) and 6.00 μ; nmr δ0.67 (s, 3H, CH$_3$) δ1.22 (s, 3H, CH$_3$) δ2.11 (s, 3H, COO—CH$_3$) δ5.70 (s, 1H, C-4 vinylic H) δ8.78 (s, 1H, COOH); mass spectrum, molecular ion, m/e 372; optical rotatory dispersion (dioxane C 0.23).

[α] 367 + 1250, [α] 358 + 1600, [α] 353 + 1400, [α] 307 + 13400, [α] 276 + 1800, [α] 247 + 20800.

Anal. Calcd for C$_{23}$H$_{32}$O$_4$: C, 74.16; H, 8.66; O, 17.18 Found: C, 74.13; H, 8.71; O, 17.10.

EXAMPLE 7

Coupling of 6β-Carboxymethylpregn-4-ene-3,20-dione with Bovine Serum Albumin

A solution was prepared containing 100 mg of a 6β-carboxymethylpregn-4-ene-3,20-dione, and 275 millimoles of tributylamine in 5 ml of dioxane. The solution was cooled to 5°C and 0.270 millimoles of i-butyl-chlorocarbonate was added. The mixture was stirred for about 30 minutes and was then added in drop-wise fashion to a solution of 500 mg of bovine serum albumin in 10 ml of water, 3 ml of dioxane and sufficient 0.1N aqueous sodium hydroxide to give pH=8.5. During the addition of the mixed anhydride solution to the bovine serum albumin, an additional 2.0 ml of 0.1N aqueous sodium hydroxide were generally added so as to keep all ingredients in solution. After the addition of the mixed anhydride was complete, a clear solution was obtained which was kept at about 0°C for about six hours. The final pH of the solution was 7.6.

Ten volumes of cold acetone were added and the solution acidified with a few drops of 1N aqueous hydrochloric acid so as to give maximum precipitation of the bovine serum albumin. The resulting mixture was centrifuged, the supernatant liquid discarded, and the resulting residue dissolved in 10 ml of water by readjusting the pH to about 7 with 1N aqueous sodium hydroxide. The above procedure was repeated twice more so as to remove all free steroid present. The final aqueous solution of the steroid bovine serum albumin conjugate at pH=7 was lyophilized.

The number of 6-carboxymethylpregn-4-ene-3,20-dione residues per molecule of bovine serum albumin was determined by the ultraviolet absorption difference at 248 nm in water solution between the conjugate and an equivalent amount of bovine serum albumin. By the above determination, it was found that the 6β-carboxymethylpregn-4-ene-3,20-dione conjugate contained 24 steroid residues per molecule of bovine serum albumin and that the 6α-carboxymethylpregn-4-ene-3,20-dione bovine serum albumin conjugate prepared in the same fashion as above contained 19 residues of steroid per molecule of bovine serum albumin.

The above procedure can be applied to the preparation of steroid conjugates with any protein having free amino groups.

EXAMPLE 8

Preparation of 6β-Carboxymethyltestosterone and Protein Conjugates

The above synthetic procedure (Examples 1–7) was applied to the preparation of testosterone-protein conjugates. The starting material for the preparation was not testosterone itself but was androst-5-ene-3,17-dione. The following intermediates isolated and characterized.

Androst-5-ene-3,17-dione bis-ethylene ketal; m.p. 171°–2°C [See Herzog et. al., *J. Amer. Chem. Soc.*, 75, 4425 (1955) for another preparation]

5α,6β-Epoxyandrostane-3,17-dione bis-ethylene ketal: m.p. 212°–3°C (See *Chemical Abstracts*, 61, page 10749h. for another preparation 5α-Hydroxy-6μ-(2-propenyl)androstan-3,17-dione bisethylene ketal; m.p. 118°–9°C (from methanol); nmr δ0.87 (s, 3H, CH$_3$) δ1.0 (s, 3H, CH$_3$) δ3.88 (s, 4H, —OCH$_2$CH$_2$O—) δ3.98 (s, 4H, —OCH$_2$CH$_2$O—) δ4.25 (s, 1H OH) δ4.97 (m, 2H, CH=CH$_2$) δ5.53 (m, 1H, —CH=CH$_2$)

5α-Hydroxy-6β-carboxymethylandrostane-3,17-dione; m.p. 204°–6°C (from methanol); nmr δ0.88 (s, 3H, CH$_3$) δ1.18 (s, 3H, CH$_3$) δ4.18 (broad, 1H, OH), infrared spectrum; absorption peaks at 5.66μ (COOH), 5.78μ (C-17 C=O), 5.89μ (C-3 C=O)

6β-Carboxymethyl-4-androstene-3,17-dione: m.p. 199°–200°C Ultraviolet spectrum; $\lambda_{max}^{EtOH}$ (log ε) 242 nm (4.25) infrared spectrum, absorption maxima at 5.77μ (COOH), 5.86μ, 5.94μ carbonyls); nmr δ0.97 (s, 3H, —CH$_3$), δ1.33 (s, 3H, —CH$_3$), δ5.97 (s, 1H, C-4 vinylic H), δ11.07 (s, 1H, COOH); molecular ion spectrum, m/e 344.

Anal. calcd. for $C_{21}H_{28}O_4$: C, 73.23; H, 8.19; O, 18.58.
Found: C, 73.02; H, 8.21; O, 18.79.

6β-Carboxymethyltestosterone

This compound was prepared from the corresponding 3,17-diketone above by reduction with sodium borohydride in methanol solution. The product of the reduction of a 3β,17β-diol which was preferentially oxidized at C-3 using activated maganese dioxide in chloroform solution as the oxidizing agent. 6β-Carboxymethyltestosterone thus prepared was an oil with the following physical characteristics: Ultraviolet spectrum $\lambda_{max}^{EtOH}$ (log ε) 241 μ (4.06); infrared spectrum, absorption peaks at 5.85μ 6.03μ; nmr, δ0.80 (s, 3H, CH$_3$) δ1.27 (s, 3H, CH$_3$) δ5.88 (s, 1H, C-4 vinylic H); molecular weight by high resolution mass spectroscopy (calculated for $C_{21}H_{30}O_4$) m/e 346.2144; found; m/e 346.2130.

Isomerization of 6β-Carboxymethyl testosterone to the corresponding 6β derivative was carried out by the procedure of Example 6. 6β-Carboxymethyltestosterone thus prepared had the following physical characteristics: The compound was an oil; ultraviolet spectrum $\lambda_{max}^{EtOH}$ (log ε) 242 μ (4.06); infrared spectrum, absorption maxima at 5.82μ (COOH) 6.00μ (C-3 C=O); nmr δ0.78 (s, 3H, CH$_3$) δ1.23 (s, 3H, CH$_3$) δ5.73 (s, 1H, C-4 vinylic H); Molecular weight by high resolution mass spectroscopy (calculated for $C_{21}H_{30}O_4$) m/e 346.2157; found, m/e 346.2144

6α and 6β-Carboxymethyltestostrone were each coupled to bovine serum albumin by the procedure of Example 7.

We claim:
1. A 6-Carboxymethyl steroid of the formula:

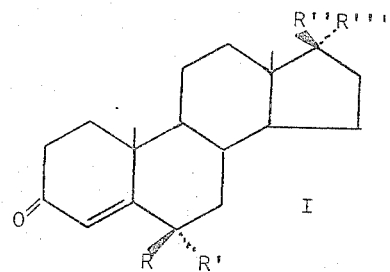

wherein one of R and R' is carboxymethyl and the other is hydrogen, wherein R'', taken singly, is hydroxy or acetyl, R''', taken singly, is hydrogen, and R'' and R''', taken together with the carbon atom to which they are attached, form a carbonyl.

2. A compound according to claim 1, said compound being 6α-carboxymethylprogesterone 3. A compound according to claim 1, said compound being 6β-carboxymethylprogesterone.

4. A compound according to claim 1, said compound being 6α-carboxymethyltestosterone.

5. A compound according to claim 1, said compound being 6β-carboxymethyltestosterone.

* * * * *